US012705527B2

(12) United States Patent
Soeken et al.

(10) Patent No.: US 12,705,527 B2
(45) Date of Patent: Aug. 11, 2026

(54) INTERVAL TESTING WITH REDUCED COMPLEXITY

(71) Applicant: Microsoft Technology Licensing, LLC, Redmond, WA (US)

(72) Inventors: Mathias Soeken, Montreux (CH); Thomas Haener, Zug (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 1254 days.

(21) Appl. No.: 17/570,988

(22) Filed: Jan. 7, 2022

(65) Prior Publication Data

US 2023/0222374 A1 Jul. 13, 2023

(51) Int. Cl.

| | |
|---|---|
| ***G06N 10/80*** | (2022.01) |
| ***G06F 7/544*** | (2006.01) |
| ***G06F 8/41*** | (2018.01) |
| ***G06N 10/20*** | (2022.01) |
| ***G06N 10/60*** | (2022.01) |

(52) U.S. Cl.

CPC ............. *G06N 10/80* (2022.01); *G06F 7/544* (2013.01); *G06F 8/443* (2013.01); *G06N 10/60* (2022.01); *G06N 10/20* (2022.01)

(58) Field of Classification Search

CPC ............ G06F 7/02; G06F 7/544; G06N 10/80

USPC .......................................................... 708/671

See application file for complete search history.

(56) References Cited

U.S. PATENT DOCUMENTS

| | | | | |
|---|---|---|---|---|
| 2019/0378032 A1* | 12/2019 | Kliuchnikov | .......... | G06N 10/40 |
| 2021/0124567 A1* | 4/2021 | Haener | .................. | G06N 10/20 |
| 2023/0112724 A1* | 4/2023 | Low | .................... | G06F 9/30036 712/7 |

OTHER PUBLICATIONS

Crandall R, Pomerance C. Chapter 1: Primes! Prime Numbers: a Computational Perspective (1st edn). Springer: Heidelberg, 2001; 1-76, ISBN 978-1-4684-9316-0 (eBook). (Year: 2001).*

Draper, Thomas G., et al. "A logarithmic-depth quantum carry-lookahead adder." arXiv preprint quant-ph/0406142 2004, Jun. 20, 2004.*

Microsoft Azure Quantum Team. "Understanding how to solve problems with a quantum computer". Date: Apr. 24, 2018 [Online]. Available: https://shorturl.at/mSnEN (Year: 2018).*

Brandão, Luís TAN, et al. "Upper bounds on the multiplicative complexity of symmetric Boolean functions." Cryptography and Communications 11.6 (2019): 1339-1362. Available: https://link.springer.com/content/pdf/10.1007/s12095-019-00377-3.pdf (Year: 2019).*

(Continued)

*Primary Examiner* — Andrew Caldwell

(74) *Attorney, Agent, or Firm* — Alleman Hall LLP

(57) ABSTRACT

A method for compiling executable code for execution on a computer includes: (a) receiving source code instructing the computer to execute an interval test to determine whether an interval defined by integers a and b encloses an integer x; (b) decomposing the interval test into a first comparison between the integer a and the integer x and a second comparison between the integer b and the integer x; and (c) returning instruction code directing the computer to evaluate the first and second comparisons cooperatively, at lower complexity than the combined complexities of the first and second comparisons enacted separately.

19 Claims, 8 Drawing Sheets

(56) References Cited

OTHER PUBLICATIONS

Häner T et al. "Improved quantum circuits for elliptic curve discrete logarithms". In: Post-quantum cryptography. Berlin: Springer; 2020. p. 425-44. https://doi.org/10.1007/978-3-030-44223-1_23. 2001.09580 [quant-ph]. (Year: 2020).*

"Qiskit circuit library. IntegerComparator" Accessed: Jun. 10, 2025 Committed in qiskit.circuit.library on GitHub: Apr. 7, 2020.[ Online]. Available: https://docs.quantum.ibm.com/api/qiskit/qiskit.circuit.library.IntegerComparator (Year: 2020).*

Anonymousket. "Quantum Algo: Deutsch Algorithm". Date: Jun. 25, 2021 [Online]. Available: https://anonymousket.medium.com/quantum-algo-deutsch-algorithm-ccc119c69c08 (Year: 2021).*

Liu, Xiao et al., Chisel-Q: Designing Quantum Circuits with a Scala Embedded Language, 2013 IEEE 31st International Conference on Computer Design (ICCD), pp. 427-434, 2013. (Year: 2013).*

Albrecht, et al., "Ciphers for MPC and FHE", In Proceedings of International Conference on the Theory and Applications of Cryptographic Techniques, Apr. 26, 2015, pp. 430-454.

Boyar, et al., "On the Multiplicative Complexity of Boolean Functions Over the Basis (∧; ⊕; 1)", In Journal of Theoretical Computer Science, vol. 235, Issue 1, Mar. 17, 2000, pp. 43-57.

Boyar, et al., "The Exact Multiplicative Complexity of the Hamming Weight Function", In Journal of Electronic Colloquium on Computational Complexity, Dec. 2003, 7 Pages.

Brandão, et al., "Upper Bounds on the Multiplicative Complexity of Symmetric Boolean Functions", In Journal of Cryptography and Communications, vol. 11, Issue 6, Jun. 14, 2019, 25 Pages.

Çalik, et al., "Boolean Functions with Multiplicative Complexity 3 and 4", In Journal of Cryptography and Communications, vol. 12, Issue 5, 2020, 14 Pages.

Çalik, et al., "The Multiplicative Complexity of 6-Variable Boolean Functions", In Journal of Cryptography and Communications: Discrete Structures, Boolean Functions and Sequences, vol. 11, Issue 1, 2018, 16 Pages.

Chase, et al., "Post-Quantum Zero-Knowledge and Signatures from Symmetric-Key Primitives", In Proceedings of Conference on Computer and Communications Security, Oct. 30, 2017, pp. 1825-1842.

Find, Magnus Gausdal, "On the Complexity of Computing Two Nonlinearity Measures", In Proceedings of the 9th International Computer Science Symposium in Russia, Jun. 7, 2014, 10 Pages.

Giacomelli, et al., "ZKBoo: Faster Zero-Knowledge for Boolean Circuits", In Proceedings of the 25th USENIX Security Symposium, Aug. 10, 2016, pp. 1069-1083.

Jones, Cody, "Novel Constructions for the Fault-Tolerant Toffoli Gate", In Repository of arXiv:1212.5069v1, Dec. 20, 2012, 5 Pages.

Meuli, et al., "The Role of Multiplicative Complexity in Compiling Low T-Count Oracle Circuits", In Repository of arXiv:1908.01609v1, Aug. 5, 2019, 8 Pages.

Mirwald, et al., "The Multiplicative Complexity of Quadratic Boolean Forms", In Foundations of Computer Science, 1987, pp. 141-150.

Schnorr, C. P., "The Multiplicative Complexity of Boolean Functions", In Proceedings of International Conference on Applied Algebra, Algebraic Algorithms, and Error-Correcting Codes, Jul. 4, 1988, pp. 45-58.

Bera, et al., "Quantum and Randomised Algorithms for Nonlinearity Estimation", In Journal of ACM Transactions on Quantum Computing vol. 2, Issue 2, Jul. 9, 2021, 27 Pages.

Häner, et al., "The Multiplicative Complexity of Interval Checking", In International Association for Cryptologic Research, Jan. 25, 2022, pp. 1-7.

"International Search Report and Written Opinion Issued in PCT Application No. PCT/US2022/054279", Mailed Date: May 12, 2023, 15 Pages.

Nelson, et al., "Chapter 4: Modular Combinational Logic—Comparators", In Publication of Englewood Cliffs, Mar. 1, 1995, 21 pages.

* cited by examiner

93
$|x_6\rangle$
$|x_5\rangle$
$|x_4\rangle$
$|x_3\rangle$
$|x_2\rangle$
$|x_1\rangle$
$|y\rangle$
$|y \oplus [34 \leq x < 41]\rangle$

INTERVAL TESTING WITH REDUCED COMPLEXITY

BACKGROUND

A quantum computer is a physical machine configured to execute logical operations based on or influenced by quantum-mechanical phenomena. Such logical operations may include, for example, mathematical computation. Current interest in quantum-computer technology is motivated by analysis suggesting that the computational efficiency of an appropriately configured quantum computer may surpass that of any practicable non-quantum computer when applied to certain types of problems. Such problems include computer modeling of natural and synthetic quantum systems, integer factorization, data searching, and function optimization as applied to systems of linear equations and machine learning.

SUMMARY

One aspect of this disclosure is directed to a quantum computer comprising a qubit register and an interface. The qubit register includes a plurality of qubits. The interface is configured to physically manipulate the qubits of the qubit register according to a sequence of quantum-logic gates parsed from executable code. The executable code directs the quantum computer to execute an interval test to determine whether an interval defined by integers a and b encloses an integer x, the interval test including a first comparison between the integer a and the integer x and a second comparison between the integer b and the integer x. The interval test comprises cooperatively evaluating the first and second comparisons cooperatively, at lower complexity than the combined complexities of the first and second comparisons enacted separately.

Another aspect of this disclosure is directed to a method for compiling executable code for execution on a computer. The method comprises: (a) receiving source code instructing the computer to execute an interval test to determine whether an interval defined by integers a and b encloses an integer x; (b) decomposing the interval test into a first comparison between the integer a and the integer x and a second comparison between the integer b and the integer x; and (c) returning instruction code directing the computer to evaluate the first and second comparisons cooperatively, at lower complexity than the combined complexities of the first and second comparisons enacted separately.

Another aspect of this disclosure is directed to a server computer system coupled operatively to a quantum computer. The server computer system comprises (d) a network interface configured to receive source code instructing the quantum computer to execute an interval test to determine whether an interval defined by integers a and b encloses an integer x; and (e) a compiler configured to decompose the interval test into a first comparison between the integer a and the integer x and a second comparison between the integer b and the integer x; and to return instruction code directing the computer to evaluate the first and second comparisons cooperatively, at lower complexity than the combined complexities of the first and second comparisons enacted separately.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

DETAILED DESCRIPTION

1. Quantum-Computer Architecture

Figure 1:
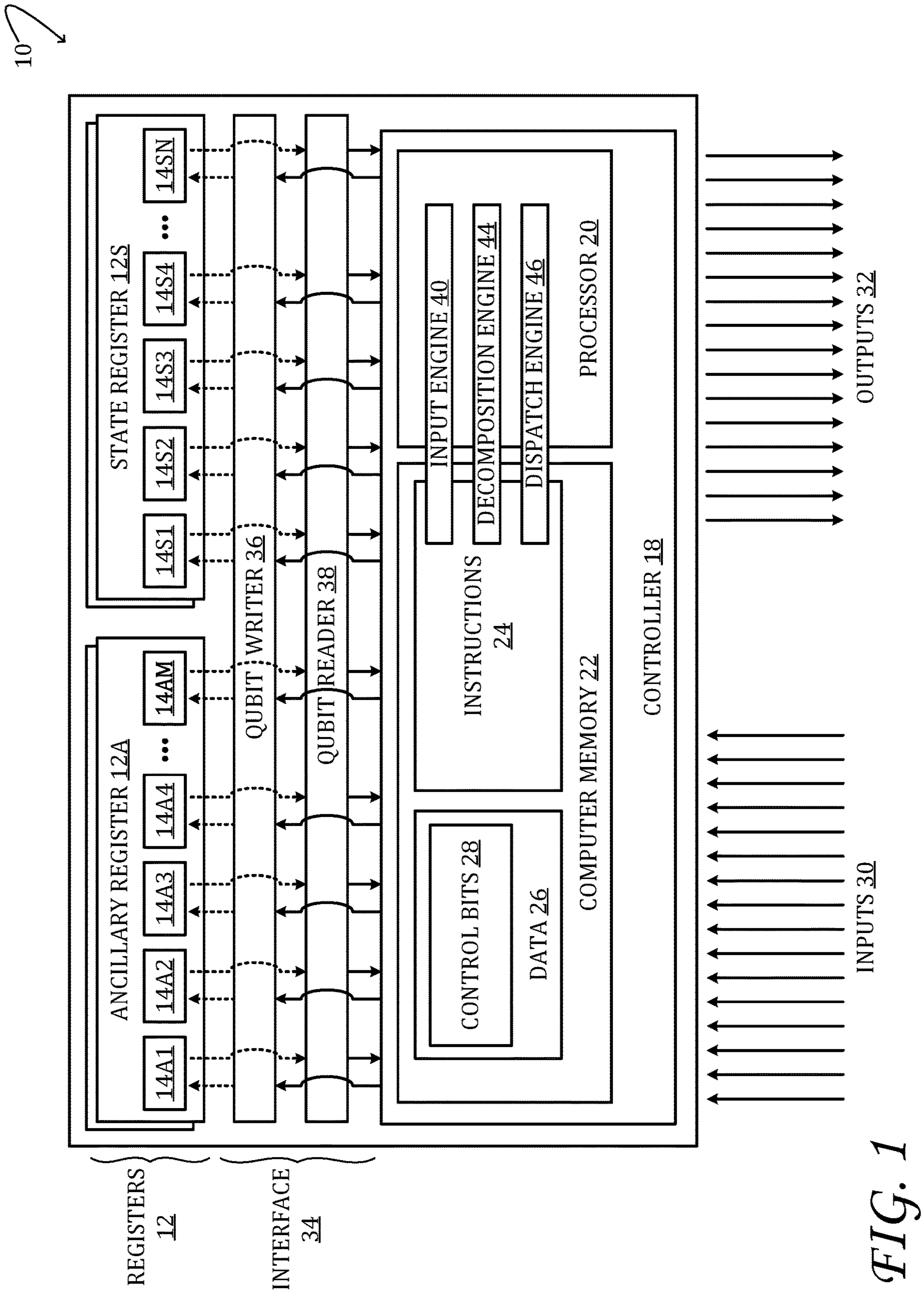
FIG. 1 shows aspects of an example quantum computer.

In order to provide a context for interval testing on a quantum computer, some aspects of an example quantum-computer architecture will first be described. Turning now to the drawings, FIG. 1 shows aspects of an example quantum computer 10 configured to execute quantum-logic operations (vide infra). Whereas conventional computer memory holds digital data in an array of bits and enacts bit-wise logic operations, a quantum computer holds data in an array of qubits and operates quantum-mechanically on the qubits in order to implement the desired logic. Accordingly, quantum computer 10 of FIG. 1 includes a set of qubit registers 12—e.g., state register 12S and ancillary register 12A. Each qubit register includes a series of qubits 14. The number of qubits in a qubit register is not particularly limited but may be determined based on the complexity of the quantum logic to be enacted by the quantum computer.

Qubits 14 of qubit register 12 may take various forms, depending on the desired architecture of quantum computer 10. Each qubit may comprise: a superconducting Josephson junction, a trapped ion, a trapped atom coupled to a high-finesse cavity, an atom or molecule confined within a fullerene, an ion or neutral dopant atom confined within a host lattice, a quantum dot exhibiting discrete spatial- or spin-electronic states, electron holes in semiconductor junctions entrained via an electrostatic trap, a coupled quantum-wire pair, an atomic nucleus addressable by magnetic resonance, a free electron in helium, a molecular magnet, or a metal-like carbon nanosphere, as non-limiting examples. A qubit may be implemented in the plural processing states corresponding to different modes of light propagation through linear optical elements (e.g., mirrors, beam splitters and phase shifters), as well as in states accumulated within a Bose-Einstein condensate. More generally, each qubit 14 may comprise any particle or system of particles that can exist in two or more discrete quantum states that can be measured and manipulated experimentally.

Figure 2:
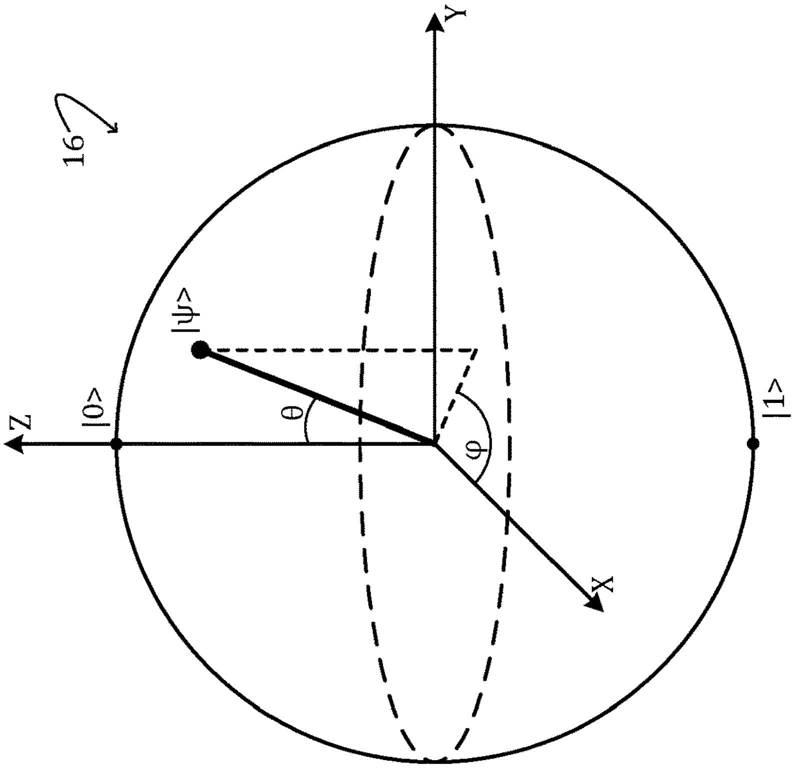
FIG. 2 illustrates a Bloch sphere, which graphically represents the quantum state of one qubit of a quantum computer.

FIG. 2 is an illustration of a Bloch sphere 16, which provides a graphical description of some quantum mechanical aspects of an individual qubit 14. In this description, the north and south poles of the Bloch sphere correspond to the standard basis vectors $|0\rangle$ and $|1\rangle$,, respectively—up and down spin states, for example, of an electron or other fermion. The set of points on the surface of the Bloch sphere comprise all possible pure states $|\psi\rangle$ of the qubit, while the interior points correspond to all possible mixed states. A mixed state of a given qubit may result from decoherence, which may occur because of undesirable coupling to external degrees of freedom.

Returning now to FIG. 1, quantum computer 10 includes a controller 18. The controller may include at least one processor 20 and associated computer memory 22. Processor 20 may be coupled operatively to peripheral componentry, such as network componentry, to enable the quantum computer to be operated remotely. Processor 20 may take the form of a central processing unit (CPU), a graphics processing unit (GPU), or the like. As such, controller 18 may comprise classical electronic componentry. The terms 'classical' and 'non-quantum' are applied herein to any component that can be modeled accurately without considering the quantum state of any individual particle therein. Classical electronic components include integrated, microlithographed transistors, resistors, and capacitors, for example. Computer memory 22 may be configured to hold program instructions 24 that cause processor 20 to execute any function or process of controller 18. The computer memory may also be configured to hold additional data 26. In some examples, data 26 may include a register of classical control bits 28 that influence the operation of the quantum computer during run time—e.g., to provide classical control input to one or more quantum-gate operations. In examples in which qubit register 12 is a low-temperature or cryogenic device, controller 18 may include control componentry operable at low or cryogenic temperatures—e.g., a field-programmable gate array (FPGA) operated at 77K. In such examples, the low-temperature control componentry may be coupled operatively to interface componentry operable at normal temperatures.

Controller 18 of quantum computer 10 is configured to receive a plurality of inputs 30 and to provide a plurality of outputs 32. The inputs and outputs may each comprise digital and/or analog lines. At least some of the inputs and outputs may be data lines through which data is provided to and/or extracted from the quantum computer. Other inputs may comprise control lines via which the operation of the quantum computer may be adjusted or otherwise controlled.

Controller 18 is operatively coupled to qubit registers 12 via quantum interface 34. The quantum interface is configured to exchange data (solid lines) bidirectionally with the controller. The quantum interface is further configured to exchange signal associated with the data (dashed lines) bidirectionally with the qubit registers. Depending on the physical implementation of qubits 14, such signal may include electrical, magnetic, and/or optical signal. Via signal conveyed through the quantum interface, the controller may interrogate and otherwise influence the quantum state held in any, some, or all of the qubit registers, as defined by the collective quantum state of the qubits therein. To that end, the quantum interface includes qubit writer 36 and qubit reader 38. The qubit writer is configured to output a signal to one or more qubits of a qubit register based on write-data received from the controller. The qubit reader is configured to sense a signal from one or more qubits of a qubit register and to output read-data to the controller based on the signal. The read-data received from the qubit reader may, in some examples, be an estimate of an observable to the measurement of the quantum state held in a qubit register. Taken together, controller 18 and interface 34 may be referred to as a 'controller system'.

In some examples, suitably configured signal from qubit writer 36 may interact physically with one or more qubits 14 of a qubit register 12, to trigger measurement of the quantum state held in the one or more qubits. Qubit reader 38 may then sense a resulting signal released by the one or more qubits pursuant to the measurement, and may furnish read-data corresponding to the resulting signal to controller 18. Stated another way, the qubit reader may be configured to output, based on the signal received, an estimate of one or more observables reflecting the quantum state of one or more qubits of a qubit register, and to furnish the estimate to controller 18. In one non-limiting example, the qubit writer may provide, based on data from the controller, an appropriate voltage pulse or pulse train to an electrode of one or more qubits, to initiate a measurement. In short order, the qubit reader may sense photon emission from the one or more qubits and may assert a corresponding digital voltage level on a quantum-interface line into the controller. Generally speaking, any measurement of a quantum-mechanical state is defined by the operator O corresponding to the observable to be measured; the result R of the measurement is guaranteed to be one of the allowed eigenvalues of O. In quantum computer 10, R is statistically related to the qubit-register state prior to the measurement, but is not uniquely determined by the qubit-register state.

Pursuant to appropriate input from controller 18, quantum interface 34 may be configured to implement one or more quantum-logic gates to operate on the quantum state held in a qubit register 12. The term 'state vector' refers herein to the quantum state held in the series of qubits 14S of state register 12S of quantum computer 10. The state vector is a convenient representation that may be used to interpret measurement outcomes. Whereas the function of each type of logic gate of a classical computer system is described according to a corresponding truth table, the function of each type of quantum gate is described by a corresponding operator matrix. The operator matrix operates on (i.e., multiplies) the complex vector representing a qubit register state and effects a specified rotation of that vector in Hilbert space.

For example, the Hadamard gate H is defined by $$H = \frac{1}{\sqrt{2}}\begin{bmatrix} 1 & 1 \\ 1 & -1 \end{bmatrix}. \tag{1}$$

The H gate acts on a single qubit; it maps the basis state $|0\rangle$ to $(|0\rangle+|1\rangle)/\sqrt{2}$, and maps $|1\rangle$ to $(|0\rangle-|1\rangle)/\sqrt{2}$. Accordingly, the H gate creates a superposition of states that, when measured, have equal probability of revealing $|0\rangle$ or $|1\rangle$..

The phase gate S is defined by $$S=\begin{bmatrix}1 & 0\\ 0 & e^{i\pi/2}\end{bmatrix}. \quad (2)$$

The S gate leaves the basis state $|0\rangle$ unchanged but maps $|1\rangle$ to $e^{i\pi/2}|1\rangle$. Accordingly, the probability of measuring either $|0\rangle$ or $|1\rangle$ is unchanged by this gate, but the phase of the quantum state of the qubit is shifted. This is equivalent to rotating ψ by 90 degrees along a circle of latitude on the Bloch sphere of FIG. 2.

Some quantum gates operate on two or more qubits. The SWAP gate, for example, acts on two distinct qubits and swaps their values. This gate is defined by $$SWAP=\begin{bmatrix}1&0&0&0\\0&0&1&0\\0&1&0&0\\0&0&0&1\end{bmatrix}. \quad (3)$$

A 'Clifford gate' is a quantum gate that belongs to the Clifford group—viz., a set of quantum gates that effect permutations of the Pauli operators. For the n-qubit case the Pauli operators form a group $$P_n=\{e^{i\theta\pi/2}\sigma_{j_1}\otimes\ldots\otimes\sigma_{j_n}|\theta=0,1,2,3,\ j_k=0,1,2,3\}, \quad (4)$$

where $\sigma_0, \ldots \sigma_3$ are the single-qubit Pauli matrices. The Clifford group is then defined as the group of unitaries that normalize the Pauli group, $$C_n=\{V\in U_{2^n}|VP_nV^{\dagger}=P_n\}. \quad (5)$$

The foregoing list of quantum gates and associated operator matrices is non-exhaustive, but is provided for ease of illustration. Other quantum gates include Pauli-X, -Y, and -Z gates, the $\sqrt{NOT}$ gate, additional phase-shift gates, the $\sqrt{SWAP}$ gate, controlled cX, cY, and cZ gates, and the Toffoli, Fredkin, Ising, and Deutsch gates, as non-limiting examples.

Figure 3:
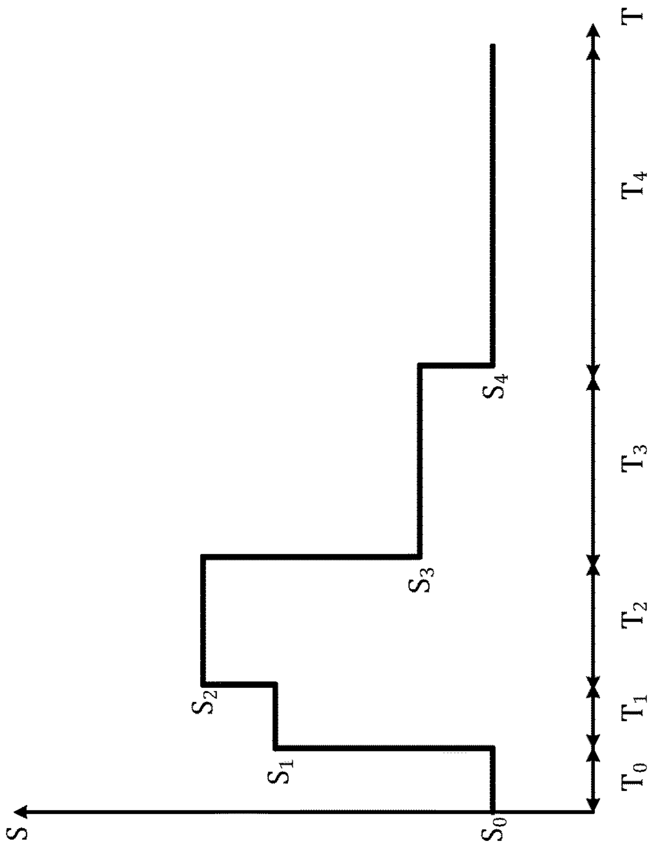
FIG. 3 shows aspects of an example signal waveform for effecting a quantum-gate operation in a quantum computer.

Continuing in FIG. 1, suitably configured signal from qubit writer 36 of quantum interface 34 may interact physically with one or more qubits 14 of a qubit register 12 so as to assert any desired quantum-gate operation. As noted above, the desired quantum-gate operations include specifically defined rotations of a complex vector representing a qubit register state. In some examples, in order to effect a desired rotation O, the qubit writer may apply a predetermined signal level $S_i$ for a predetermined duration $T_i$. In some examples, plural signal levels may be applied for plural sequenced or otherwise associated durations, as shown in FIG. 3, to assert a quantum-gate operation on one or more qubits of a qubit register. In general, each signal level $S_i$ and each duration $T_i$ is a control parameter adjustable by appropriate programming of controller 18.

The terms 'oracle' and 'quantum algorithm' are used herein to describe a predetermined sequence of elementary quantum-gate and/or measurement operations executable by quantum computer 10. An oracle may be used to transform the quantum state of a qubit register 12 to effect a classical or non-elementary quantum-gate operation or to apply a density operator, for example. In some examples, an oracle may be used to enact a predefined 'black-box' operation $f(x)$, which may be incorporated into a complex sequence of operations. To ensure adjoint operation, an oracle mapping n input qubits $|x\rangle$ to m output or ancilla qubits $|y=f(x)\rangle$ may be defined as a quantum gate $O(|x\rangle\otimes|y\rangle)$ operating on the (n+m) qubits. In this case, O may be configured to pass the n input qubits unchanged but combine the result of the operation $f(x)$ with the ancillary qubits via an XOR operation, such that $O(|x\rangle\otimes|y\rangle)=|x\rangle\otimes|y\oplus f(x)\rangle$.

Implicit in the description herein is that each qubit 14 of any qubit register 12 may be interrogated via quantum interface 34 so as to reveal with confidence the standard basis vector $|0\rangle$ or $|1\rangle$ that characterizes the quantum state of that qubit. In some implementations, however, measurement of the quantum state of a physical qubit may be subject to error. Accordingly, any qubit 14 may be implemented as a logical qubit, which includes a grouping of physical qubits measured according to an error-correcting oracle that reveals the quantum state of the logical qubit with above-threshold confidence.

2. Interval-Test Overview

This disclosure examines the computational cost of testing whether $a\leq x<b$ for constants a, b and an n-bit input integer x. The analysis herein shows that, using Deutsch's algorithm, the interval test can be performed using a single comparison on a quantum computer. Perhaps surprisingly, it is possible to achieve the same (and in some cases lower) costs with classical logic networks: n−1 (or fewer) AND gates are shown to be sufficient to perform the interval test. The resulting construction is shown to be optimal with respect to the number of AND gates, as it matches the multiplicative complexity of the interval test.

The multiplicative complexity of a Boolean function $f$ is the smallest number of AND gates in any logic network composed of binary AND gates, XOR gates, and inverters (NOT gates), that represents $f$. Researchers use the multiplicative complexity as an important characteristic metric to measure the cost of cryptographic implementations in secure computation protocols [Ref. 1], [Ref. 2], [Ref. 3] or the cost of fault-tolerant implementations of quantum operations [Ref. 4]. The multiplicative complexity is intractable to compute [Ref. 5] and for a random n-variable Boolean function $f$ it is at least $2^{n/2}-O(n)$ with high probability [Ref. 6]. However, for several families of Boolean functions the multiplicative complexity has been analyzed. These include quadratic functions [Ref. 7], all functions up to six variables [Ref. 8], all functions with a multiplicative complexity of at most 4 [Ref. 9], all symmetric functions [Ref. 10], and the Hamming weight function [Ref. 11].

This disclosure reveals the multiplicative complexity of the interval test $[a\leq x<b]$, where a and b are two non-negative constant integers and x is an n-bit non-negative integer. Derived herein is an upper bound on the multiplicative complexity, via a proposed construction to implement the interval test, and a matching lower bound based on the algebraic degree of the function (i.e., the largest monomial in the algebraic normal form of a function). This proves that the construction is optimal with respect to the number of AND gates. The main result appears in Theorem 1.

In some examples the interval test may be implemented on a quantum computer. Note that one may rewrite $[a \le x < b]$ as $[a \le x] \wedge \neg [b \le x]$. Since $a < b$, this is equivalent to $$[a \le x] \oplus [b \le x]. \tag{6}$$

Deutsch's quantum algorithm requires a single quantum query to determine whether a function $g:\{0, 1\} \rightarrow \{0, 1\}$ is constant. Therefore, by defining $$g_{x,a,b}(y) := \begin{cases} [a \le x] & \text{if } y = 1, \\ [b \le x] & \text{otherwise,} \end{cases} \tag{7}$$

which can be implemented on a quantum computer using a single n-bit '≤'-comparison, Deutsch's algorithm can be used to perform the interval test with the cost of a single comparison (i.e., at most $n-1$ AND gates). A more detailed description and a quantum circuit diagram is provided hereinafter. Perhaps surprisingly, it turns out that the same result holds when using classical logic networks that do not rely on quantum interference. Starting from Eq 6, construction of a logic network with the optimal number of AND gates is shown. The main result is the following theorem.

Theorem 1. Main Result.

Let $n > 0$ be the number of bits, and let a, b be two constant integers $a < b < 2^n$. Let $j_a$ and $j_b$ denote the number of trailing zeros in the binary representation of a and b, respectively. (Note that the number of trailing zeros in the binary representation of $a \ge 0$ is the largest integer $j \le n$ such that $a/2^j$ is an integer.) Then, the interval test $a \le x < b$ for some arbitrary n-bit non-negative integer x has a multiplicative complexity of $$\begin{cases} n - \min\{j_a, j_b\} - 1 & \text{if } j_a \ne j_b, \\ n - j_a - 2 & \text{otherwise.} \end{cases} \tag{8}$$

3. Interval-Test Framework

Introduced in this section are algebraic normal form (ANF), algebraic degree, and AND/OR chains, which are a family of Boolean functions central to the implementation of comparison with constants. #S is used to denote the cardinality of some set S, and $\mathrm{ite}(x, f, g) := (x \wedge f) \oplus (\bar{x} \wedge g)$ denotes the if-then-else function.

Definition 1. Algebraic Normal Form.

Let $S = \{1, \ldots, n\}$ and $x_i \in \{0, 1\}$. Then $$f(x_1, \ldots, x_n) = \bigoplus_{I \subseteq S} a_I \bigwedge_{i \in I} x_i \tag{9}$$

is the algebraic normal form (ANF) of $f$ for some assignment to the coefficients $a_I \in \{0, 1\}$. Each AND-term in Eq 9, where $a_I = 1$, is called a monomial of $f$.

Example 1

The ANF of $x_1 \vee x_2 = x_1 \oplus x_2 \oplus (x_1 \wedge x_2)$. Here $a_\emptyset = 0$, but $a_{\{1\}} = a_{\{2\}} = a_{\{1,2\}} = 1$. Note that every Boolean function has a unique ANF, since there are $2^n$ coefficients in Eq 9 and there exist $2^{2^n}$ Boolean functions over n variables.

Definition 2. Algebraic Degree.

The algebraic degree of a Boolean function $f$ is $$deg(f) = \max\{\#I \mid a_I = 1\}, \tag{10}$$

where the coefficients $a_I$ are given by the ANF of $f$. In other words, the algebraic degree of $f$ is given by the number of variables in its largest monomial.

Definition 3. Multiplicative Complexity.

Let $f$ denote a Boolean function. The multiplicative complexity of $f$, denoted by $c_\wedge(f)$, is the minimal number of AND gates in any logic network for $f$ over the gate set $\{\wedge, \oplus, \neg\}$, which consists of the 2-input AND and XOR gates and inverters. Note that OR gates can be considered AND gates in the context of the multiplicative complexity (see also Example 1).

Lemma 1. Proposition 3.8, [Ref. 12]

For all Boolean functions $f$, $c_\wedge(f) \ge \deg(f) - 1$.

Definition 4. AND/OR Chain.

Given Boolean variables $x_1, x_2, \ldots, x_k$, $k \ge n$, an AND/OR chain is any formula $$f = x_1 \circ_1 (x_2 \circ_2 ( \ldots (x_{n-1} \circ_{n-1} x_n) \ldots )), \tag{11}$$

where $\circ_i \in \{\wedge, \vee\}$. $l(f) = n-1$ now refers to the length of $f$.

Lemma 2.

Let $f$ be an AND/OR chain. Then $\deg(f) = l(f) + 1$ and $c_\wedge(f) = l(f)$.

Proof.

Proven here is that $\deg(f) = l(f) + 1$ by induction over the length l of an AND/OR chain. The statement holds trivially for $l = 0$. Assuming that the statement holds for l, consider a function $x \circ f$, where $\circ \in \{\wedge, \vee\}$ and $f$ is an AND/OR chain and $l(f) = l$. Further, x is not in the support of $f$. Then, $\deg(x \circ f) = \deg((x \oplus f)[\circ = \vee] \oplus (x \wedge f)) = \deg(x \wedge f) = 1 + \deg(f) = l(f) + 2$. Since the number of operators in $f$ is $l(f)$, using Lemma 1, it follows that $c_\wedge(f) = l(f)$.

Lemma 3.

Let $a = (a_1 \ldots a_{n-1} 1)_2$ be an odd constant integer and let $x = (x_1 \ldots x_n)_2$ be an arbitrary n-bit non-negative integer. Then, the AND/OR chain $x_1 \circ_1 (x_2 \circ_2 ( \ldots (x_{n-1} \circ_{n-1} x_n) \ldots ))$, with $$c_i = \begin{cases} \vee & \text{if } a_i = 0, \\ \wedge & \text{if } a_i = 1, \end{cases} \tag{12}$$

evaluates $[a \le x]$.

Proof.

The statement is proven by using induction over n. For $n = 1$, $a = 1$ and $x = x_1$, and $[1 \le x] = x_1$. It is assumed that the statement holds for any odd constant integer of length n. Consider a constant $a = a_1 2^n + a'$ for some constant integer a' of length n. If $a_1 = 0$, then $[a' \le x] = x_1 \vee [a' \le (x_2 \ldots x_{n+1})_2]$. If $a_1 = 1$, then $[2^n + a' \le x] = x_1 \wedge [a' \le (x_2 \ldots x_{n+1})_2]$. The following corollary shows how comparing against an even number can be cast into a comparison against an odd number.

Corollary 1.

Let $a = 2^j k > 0$ be a constant integer, where k is odd. Evaluating $[a \le x]$ is equivalent to evaluating $[a/2^j \le (x_1 \ldots x_{n-j})_2]$, and therefore $c_\wedge([a \le x]) = n - j - 1$.

4. Interval-Test Construction

Described in this section is an algorithm to construct a logic network to evaluate $[a \le x < b]$ starting from Eq 6. A straightforward upper bound on the number of AND gates is the sum of the costs of both individual comparisons. However, a construction will be presented that incurs at most the cost of the more costly comparison, and it is shown that saving an additional AND gate is possible if both comparisons individually have the same cost.

The construction is based on iteratively evaluating $[a \le x] \oplus [b \le x] = (x_1 \circ f_1) \oplus (x_1 \bullet f_2)$. Both $f_1$ and $f_2$ are either AND/OR chains or constants, and $\circ$ and $\bullet$ are either $\wedge$ or $\vee$. The variables involved in $f_1$ and $f_2$ are either the same and appear in the same order, or the variables in one chain are the prefix of the variables in the other chain. A method for evaluating this chain depending on the choice of $\circ$ and $\bullet$ is now shown. In some cases this leads to a formula involving $f_1 \oplus f_2$, in which case it is possible to recurse. Otherwise the 'ite' operation is evaluated on two AND/OR chains, as discussed hereinafter.

In the case in which $f_1$ or $f_2$ is a constant, either $$x \oplus (x \wedge f) = x \wedge \bar{f} \text{ or } x \oplus (x \vee f) = \bar{x} \wedge f, \tag{13}$$

and the iteration stops. Otherwise, one of the following three cases applies:

$$(x \wedge f_1) \oplus (x \wedge f_2) = x \wedge (f_1 \oplus f_2) \tag{14a}$$

$$(x \vee f_1) \oplus (x \vee f_2) = \bar{x} \wedge (f_1 \oplus f_2) \tag{14b}$$

$$(x \wedge f_1) \oplus (x \wedge f_2) = \text{ite}(x, \bar{f}_2, f_1) \tag{14c}$$

Proof.

Equations Eq 13 and Eq 14a follow from straightforward Boolean identities. For Eq 14b, note that $(x \vee f_1) \oplus (x \vee f_2) = (\bar{x} \wedge \bar{f}_1) \oplus (\bar{x} \wedge \bar{f}_2) = \bar{x} \wedge (f_1 \oplus f_2)$, by applying De Morgan's law and using the fact that $\bar{x} \oplus \bar{x} = x \oplus x$. By expanding the first term in Eq 14c into an ANF, one obtains $f_1 \oplus (x \wedge f_1) \oplus x \oplus (x \wedge f_2)$. Then the first two and the last two terms can be merged into $(\bar{x} \wedge f_1) \oplus (x \wedge \bar{f}_2) = \text{ite}(x, \bar{f}_2, f_1)$.

Shown next is a special construction for $\text{ite}(x, \bar{f}_2, f_1)$ that exploits the fact that $f_1$ and $f_2$ are both AND/OR chains. Their formulas are similar, and only differ in their lengths and in what operators are used. The idea is to propagate the inversion of $f_2$ into the formula (using De Morgan's laws) in a way that ensures that the operators in $f_1$ and $f_2$ match. Then, the inversions and potential chain suffixes (in case one chain is longer than the other) can be implemented in the same formula conditional on x. Before proving the general case, the following examples should help to provide some intuition. In the first example, both chains have the same length and no operators are equal.

Example 2

Let $f_1 = x_2 \vee (x_3 \wedge x_4)$ and $f_2 = x_2 \wedge (x_3 \vee x_4)$. Then $$\bar{f}_2 = \overline{x_2 \wedge (x_3 \vee x_4)} \tag{15}$$

$$= \bar{x}_2 \vee \overline{(x_3 \vee x_4)} \tag{16}$$

$$= \bar{x}_2 \vee (\bar{x}_3 \wedge \bar{x}_4), \tag{17}$$

and therefore $$ite(x_1, \bar{f}_2, f_1) = (x_1 \oplus x_2) \vee ((x_1 \oplus x_3) \wedge (x_1 \oplus x_4)). \tag{18}$$

Note how this formula evaluates to $f_1$, if $x_1=0$, and to $\bar{f}_2$, if $x_1=1$. In the second example, the chains still have the same length, but one operator is the same both chains.

Example 3

Let $f_1 = x_2 \vee (x_3 \wedge x_4)$ and $f_2 = x_2 \vee (x_3 \vee x_4)$. Then $$\bar{f}_2 = \overline{x_2 \vee (x_3 \vee x_4)} \tag{19}$$

$$= \overline{x_2 \vee \overline{\overline{(x_3 \vee x_4)}}} \tag{20}$$

$$= \overline{x_2 \vee \overline{(\bar{x}_3 \wedge \bar{x}_4)}}, \tag{21}$$

and therefore $$ite(x_1, \bar{f}_2, f_1) = x_1 \oplus (x_2 \vee (x_1 \oplus ((x_1 \oplus x_3) \wedge (x_1 \oplus x_4)))). \tag{22}$$

Note how the inverter is not propagated when the operators are the same, but a double negation is introduced to further propagate the inverter to the remaining part of the chain. Considered in the final example is the case in which one chain is longer than the other.

Example 4

Let $f_1 = x_2 \wedge (x_3 \vee x_4)$ and $f_2 = x_2 \vee (x_3 \wedge (x_4 \vee x_5))$. Then $$\bar{f}_2 = \overline{x_2 \vee (x_3 \wedge (x_4 \vee x_5))} \tag{23}$$

$$= \bar{x}_2 \wedge \overline{(x_3 \wedge (x_4 \vee x_5))} \tag{24}$$

$$= \bar{x}_2 \wedge \left(\bar{x}_3 \vee \overline{(x_4 \vee x_5)}\right), \tag{25}$$

and therefore $$ite(x_1, \bar{f}_2, f_1) = (x_1 \oplus x_2) \wedge ((x_1 \oplus x_3) \vee (x_1 \oplus (x_4 \vee (x_1 \wedge x_5)))). \tag{26}$$

Note how $x_1$ is not only used to invert subterms of the formula, but also to conditionally include $x_5$ to represent $\bar{f}_2$.

In view of the above, it is now possible to enumerate all cases for $f_1$ and $f_2$ in $\text{ite}(x, \bar{f}_2, f_1)$. In the following, $x_i \neq x_j$, and both variables are not in the supports of $f_1$ and $f_2$. The terminal cases apply when $l(f_1)=0$ or $l(f_2)=0$:

$$ite(x_i, \bar{x}_j, x_j) = x_i \oplus x_j \tag{27a}$$

$$ite(x_i, \bar{x}_j, x_j \wedge f) = (x_i \oplus x_j) \wedge (x_i \vee f) \tag{27b}$$

$$ite(x_i, \bar{x}_j, x_j \vee f) = (x_i \oplus x_j) \vee (\bar{x}_i \wedge f) \tag{27c}$$

$$ite\left(x_i, \overline{x_j \wedge f}, x_j\right) = (x_i \oplus x_j) \vee \left(x_i \wedge \bar{f}\right) \tag{27d}$$

$$ite\left(x_i, \overline{x_j \vee f}, x_j\right) = (x_i \oplus x_j) \wedge \left(\bar{x}_i \vee \bar{f}\right) \tag{27e}$$

In the remaining four cases, the operands are either the same or different from each other:

$$ite\left(x_i, \overline{x_j \vee f_2}, x_j \wedge f_1\right) = (x_i \oplus x_j) \wedge ite\left(x_i, \bar{f}_2, f_1\right) \tag{28a}$$

$$ite\left(x_i, \overline{x_j \wedge f_2}, x_j \vee f_1\right) = (x_i \oplus x_j) \vee ite\left(x_i, \bar{f}_2, f_1\right) \tag{28b}$$

$$ite\left(x_i, \overline{x_j \wedge f_2}, x_j \wedge f_1\right) = x_i \oplus \left(x_j \wedge \left(x_i \oplus ite\left(x_i, \bar{f}_2, f_1\right)\right)\right) \tag{28c}$$

$$ite\left(x_i, \overline{x_j \vee f_2}, x_j \vee f_1\right) = x_i \oplus \left(x_j \vee \left(x_i \oplus ite\left(x_i, \bar{f}_2, f_1\right)\right)\right) \tag{28d}$$

All these identities are readily verified by expressing both sides of the equation as an ANF. Identities such as $x \oplus x = 0$ and $\bar{x} \wedge y = x \oplus (x \wedge y)$ are very useful in the derivations.

5. Classical- and Quantum-Computation Methods

Figure 10:
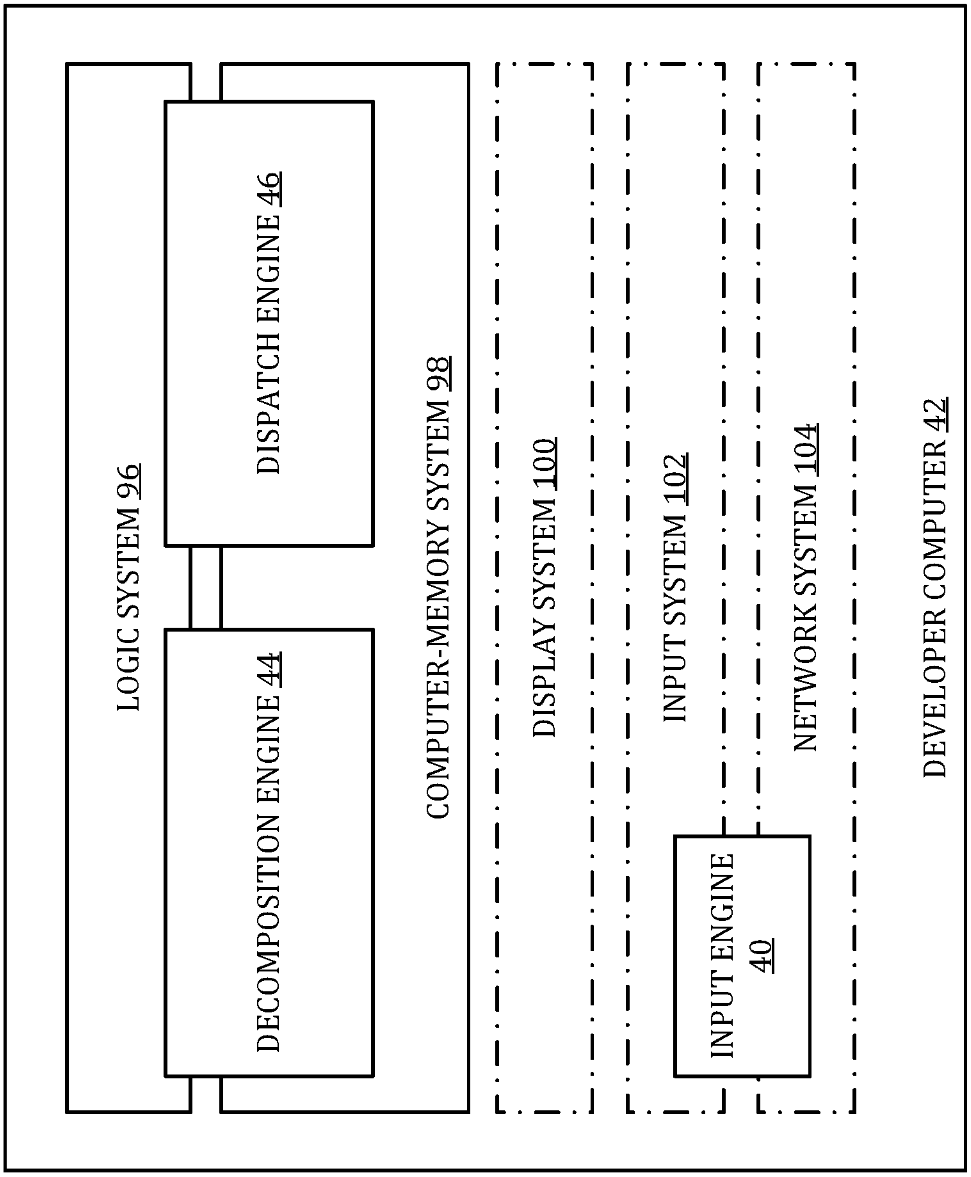
FIG. 10 shows aspects of an example classical computer system.

The principles hereinabove can be implemented in various quantum- and classical-computing scenarios. In one example scenario, a developer or team of developers may develop source code targeting a particular task or problem. The source code may be composed in a relatively high-level computer language—e.g., an implementation-agnostic language. Referring briefly to FIG. 10, source code may be received in a suitably configured input engine 40 of a developer computer 42. The input engine is coupled operatively to decomposition engine 44 and dispatch engine 46. The decomposition engine is configured to convert (i.e., to 'decompose' or 'compile') the source code into a sequence of more primitive instructions—e.g., quantum gates or Boolean gates.

In quantum-computing examples, the sequence of primitive instructions may take the form of a directed acyclic graph (DAG), G=(V, E), where each of a set of vertices V corresponds to a quantum-gate operation, and where an edge $(v, w) \in E$ joins vertices v and w if the computation at v depends on the result of the computation at w. As a simple example, in order to compute the length of the hypotenuse of a right triangle with sides of length a and b, the computation $\sqrt{a^2+b^2}$ is formulated as a graph with four vertices, which represent the two squaring operations, the addition operation, and the square-root operation. Via dispatch engine 46, the sequence of instructions is dispatched to the communicatively coupled quantum computer. As noted in Section 1, the low-level instructions assembled by decomposition engine 44 may comprise matrix multiplications (e.g., one- and two-qubit gates), which are effected by sending predefined signals into the state register from classical interface hardware. The signals may also trigger a measurement, where return signal is received back into the interface hardware from the state register. In some examples, the decomposition engine is configured to select each of the low-level operations from a predefined set consisting of operations and/or measurement. The result of a given measurement may affect which portions of the DAG are subsequently executed.

Figure 4:
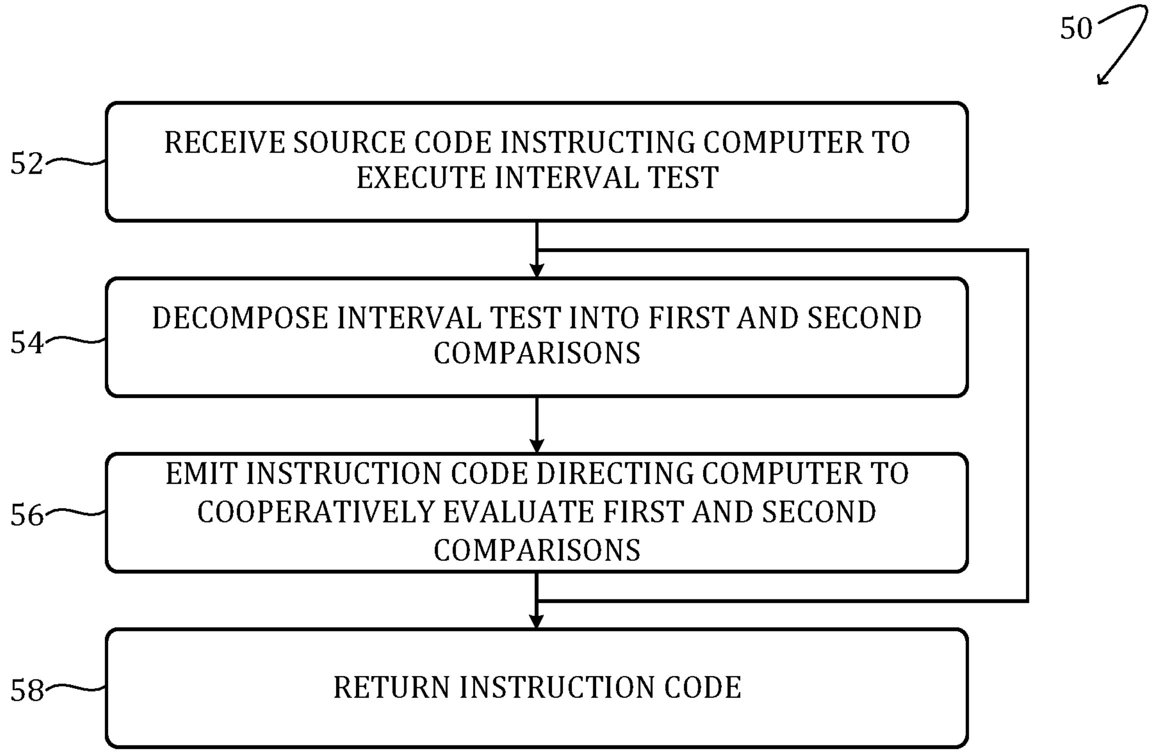
FIG. 4 shows aspects of an example method for compiling executable code for execution on a computer.

In view of the above context, FIG. 4 shows aspects of an example method 50 for compiling executable code for execution on a computer. The computer for which the executable code is compiled may be a quantum computer in some examples and a classical computer in other examples. Irrespective of the type of computer for which the executable code is compiled, method 50 is enacted on a developer computer, which is typically a classical computer system. In some examples, the developer computer supporting the method may include input, decomposition, and dispatch engines as noted above. The developer computer may be a server computer system coupled operatively to a remote computer—in some examples a quantum computer. More particularly, the server computer system may comprise a network interface configured to receive source code instructing the remote computer to execute an interval test to determine whether an interval defined by integers a and b encloses an integer x. The server computer system may also comprise a compiler configured to decompose the interval test into a first comparison between the integer a and the integer x and a second comparison between the integer b and the integer x and return instruction code directing the remote computer to evaluate the first and second comparisons cooperatively, at lower complexity than the combined complexities of the first and second comparisons enacted separately. Selected additional features of a developer computer to support method 50 are described hereinafter, with reference to FIG. 10.

In method 50, the developer computer receives source code that includes one or more interval tests. For each interval test appearing in the source code, the developer computer emits a corresponding sequence of executable instructions to enact the interval test. Instructions compiled for execution on a classical computer will require a certain number of AND gates to complete the interval test. Analogously, instructions compiled for execution on a quantum computer will require a certain number of CCZ gates or T magic states to complete the interval test. One objective of method 50 is to enact each interval test using the least number of AND gates or T-magic gates, which drive the computational cost of classical and quantum algorithms, respectively.

Turning now to FIG. 4, at 52 of method 50 the input engine of the developer computer receives source code instructing a computer to execute an interval test. The interval test is a test to determine whether an interval defined by integers a and b encloses an integer x. In some examples the interval to be tested is a half-open interval—viz., $a \le x < b$. In some examples, the source code may include a plurality of interval tests.

At 54 the decomposition engine of the developer computer decomposes a given interval test into a first comparison between the integer a and the integer x and a second comparison between the integer b and the integer x. In some examples the decomposition engine may decompose the interval test into the XOR of these two comparisons.

At 56 the decomposition engine of the developer computer emits instruction code directing the computer to cooperatively evaluate the first and second comparisons. The instruction code is configured such that the first and second comparisons are evaluated cooperatively, at lower complexity than the combined complexities of the first and second comparisons enacted separately. In some examples the sequence of decomposing the interval test and emitting the instruction code may be repeated for every interval test appearing in the source code.

At 58 the dispatch engine of the developer computer returns the compiled instruction code directing the computer to cooperatively evaluate the first and second comparisons.

Figure 5:
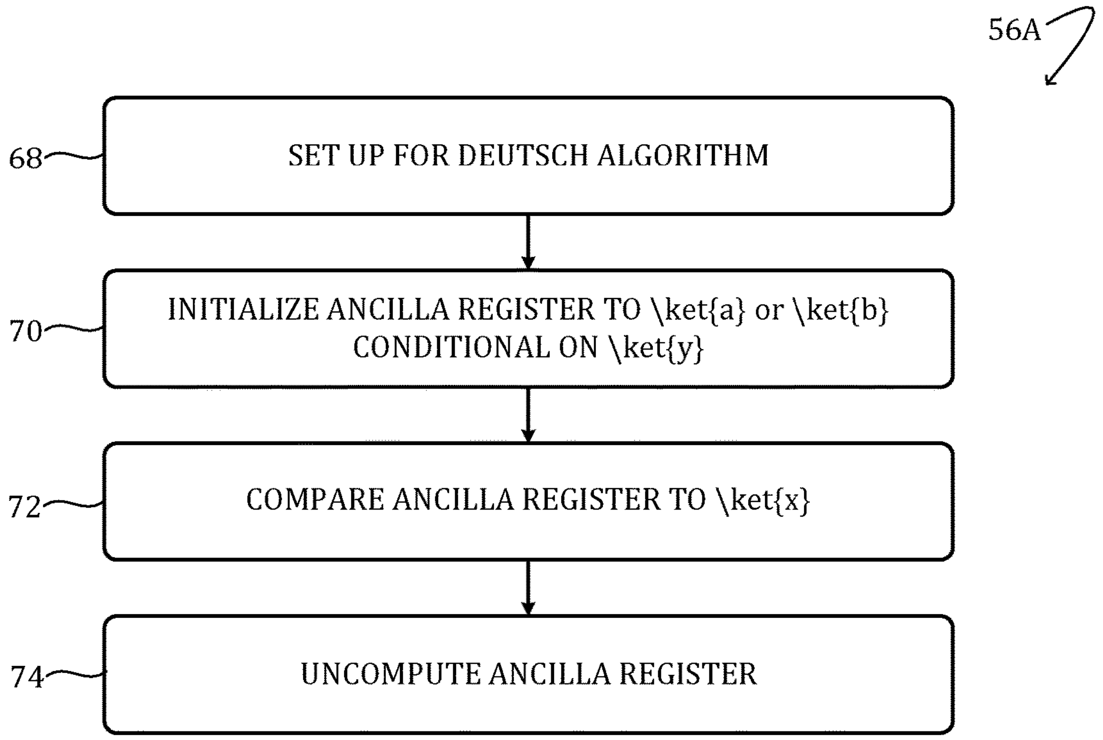
FIG. 5 shows aspects of an example method for emitting instruction code that directs a quantum computer to cooperatively evaluate first and second comparisons in the method of FIG. 4.

The subsequent flow diagrams of this disclosure provide more particular instantiations of block 56 of method 50. For instance, FIG. 5 shows aspects of an example method 56A for emitting instruction code that directs a quantum computer to cooperatively evaluate the first and second comparisons in method 50. In some examples, the illustrated blocks in FIG. 5 may correspond to blocks of instruction code emitted by the decomposition engine of the developer computer enacting method 50. In general, the emitted instruction code comprises a sequence of quantum-logic gates. In some examples that sequence may be limited to the universal gate set {H, S, CNOT, T}. In some examples, the instruction code may comprise a graph, such as a directed acyclic graph (DAG), or a portion of a graph.

In each case the executable instruction code emitted in method 56A directs the quantum computer to execute an interval test to determine whether an interval defined by integers a and b encloses an integer x. The interval test comprises a first comparison between the integer a and the integer x and a second comparison between the integer b and the integer x, wherein the first and second comparisons are evaluated cooperatively and at lower complexity than the complexity of the first comparison plus the complexity of the second comparison. In this and other quantum-computing examples, the complexity may be proportional to the number of Toffoli gates in the sequence. Significantly, the executable instruction code emitted in method 56 directs the computer to implement the interval test via a single comparator gate, via a Deutsch algorithm.

Figure 6:
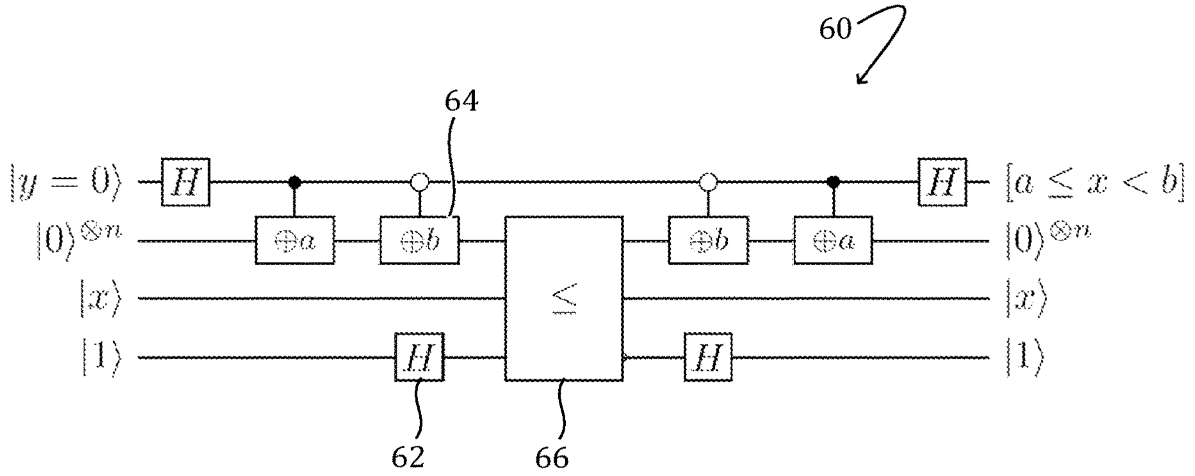
FIG. 6 shows aspects of an example quantum circuit implemented according to the method of FIG. 5.

FIG. 6 shows aspects of an example quantum circuit 60 that may be implemented according to method 56A. More particularly, the quantum circuit evaluates $[a \le x < b]$ with the cost of a single ≤-comparator using Deutsch's algorithm. Quantum circuit 60 includes Hadamard gates 62, XOR gates 64, and a comparator 66. Starting from (6), it follows that $x \in [a, b)$ if and only if the function $$g_{x,a,b}(y) = \begin{cases} [a \le x] & \text{if } y = 1 \\ [b \le x] & \text{otherwise,} \end{cases}$$

is non-constant, i.e., if $g_{x,a,b}(0) \neq g_{x,a,b}(1)$. Using Deutsch's quantum algorithm, it is possible to determine whether $g_{x,a,b}$ is constant using a single quantum query to this function. The quantum oracle that evaluates $g_{x,a,b}$ on an input qubit $|y\rangle$ can be constructed by first initializing an extra register to $|a\rangle$ or $|b\rangle$, conditional on $|y\rangle$ (using CNOT gates) and then performing a regular comparison between the extra register and $|x\rangle$ before uncomputing the extra register. The cost in terms of CCZ or T magic states is therefore equivalent to that of a single comparison circuit.

Returning now to FIG. 5, at 68 the decomposition engine emits instruction code directing the computer to set up the state register and various ancillary registers for execution of an interval-test oracle. For instance, the Hadamard gates positioned around the oracle (62 in FIG. 6) may be set up at this stage of the process. The remaining blocks provide the functionality of the oracle itself. At 70 the decomposition engine emits instruction code directing the computer to initialize an ancilla register to either $|a\rangle$ or $|b\rangle$ conditional on an input $|y\rangle$, where $|y\rangle$ is a single-qubit basis state. In some examples, one or more CNOT gates are used to encode the conditional dependence on $|y\rangle$.. At 72 the decomposition engine emits instruction code directing the computer to compare the ancilla register to $|x\rangle$. At 74 the decomposition engine emits instruction code directing the computer to uncompute the ancilla register, so that the register may be used for subsequent computation.

Figure 7:
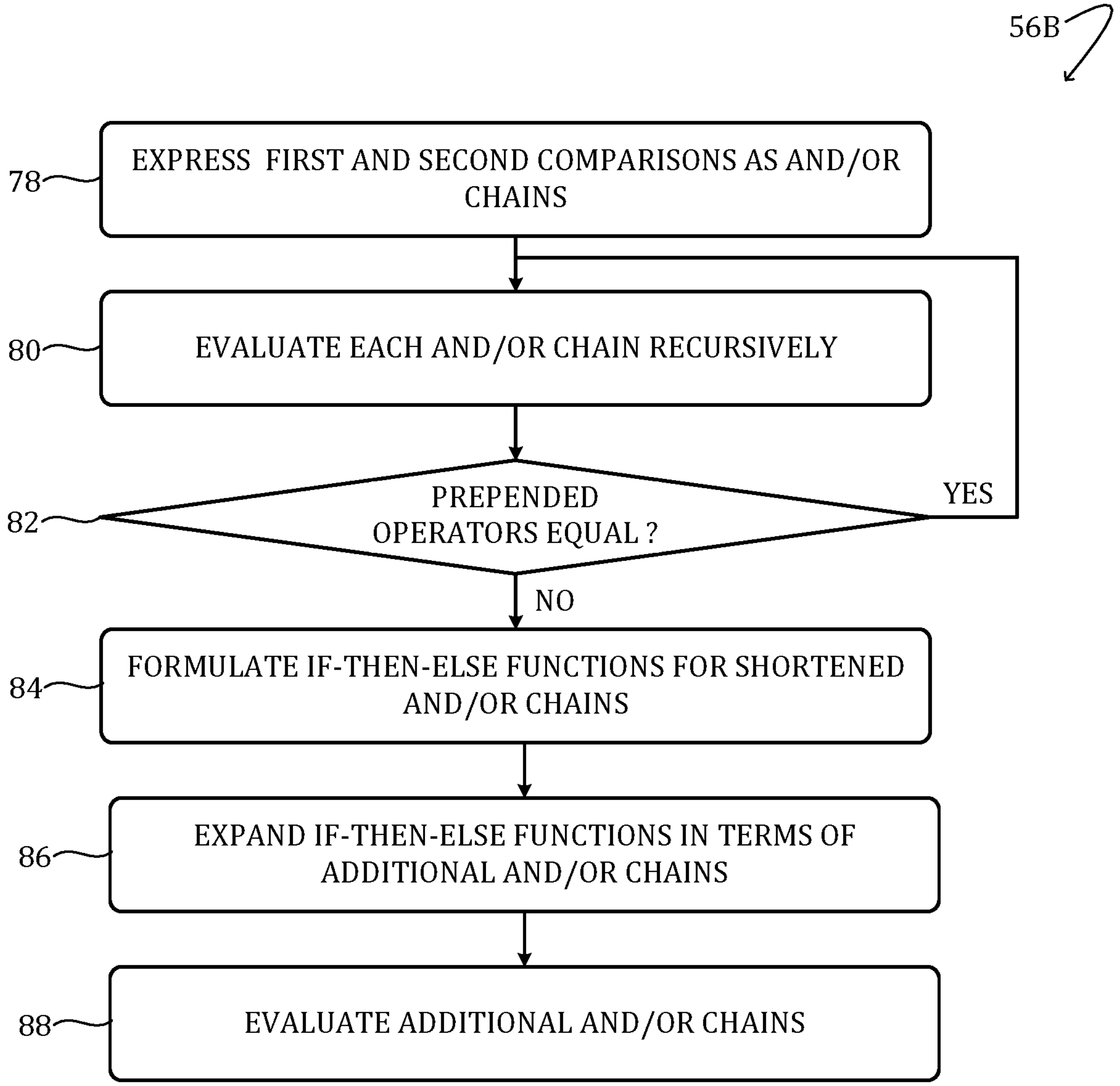
FIG. 7 shows aspects of an example method for emitting instruction code that directs a computer to cooperatively evaluate first and second comparisons in the method of FIG. 4.

FIG. 7 shows aspects of another example method 56B for emitting instruction code that directs a computer to cooperatively evaluate the first and second comparisons in method 50. In some examples, the illustrated blocks in FIG. 7 may correspond to blocks of instruction code emitted by the decomposition engine of the developer computer enacting method 50. In general, the emitted instruction code comprises a sequence of Boolean gates. In some examples, the instruction code may comprise a straight-line sequence of Boolean AND, XOR, and NOT gates. As noted hereinabove, the interval test comprises cooperatively evaluating first and second comparisons at lower complexity than the complexity of the first comparison plus the complexity of the second comparison. In this and other examples, the complexity may be proportional to the number of AND gates in the sequence. Method 56B is directly applicable to implementations in which the instruction code is executed on a classical computer. For instance, instruction code emitted according to method 56B may be incorporated into a cryptographic program executing on a classical computer. Method 56B is further applicable to implementations in which the instruction code is executed on a quantum computer after appropriate translation into quantum gates—e.g., reversible quantum gates and/or measurement. That aspect is detailed hereinafter in connection to FIG. 8.

At 78 of method 56B, the decomposition engine emits instruction code directing the computer to express each of the first and second comparisons as respective first and second AND/OR chains $x_1 \circ f(x_1, \ldots, x_n)$, where $f$ is a Boolean function of bit values $x_i$ of the integer x, and where $\circ$ is an AND operator or an OR operator. In some examples, $f = x_1 c_1 (x_2 c_2 ( \ldots (x_{n-1} c_{n-1} x_n) \ldots ))$, where, for any odd value $(a_1 \ldots a_{n1})$ of the integer a, $c_i$=OR if $a_i$=0 and $c_i$=AND if $a_i$=1.

At 80 the decomposition engine emits instruction code directing the computer to evaluate the first and second AND/OR chains recursively, thereby shortening each of the AND/OR chains until the prepended operator of the first AND/OR chain differs from the prepended operator of the second AND/OR chain. Accordingly, at 82 it is determined whether the prepended operators of the first and second AND/OR chains are equal. Each time that the prepended operators of the first and second AND/OR chains are found to be equal, method 56B returns to 80, where another recursive evaluation is enacted, peeling off identical prepended operators before continuing the recursion. When the prepended operator of the first AND/OR chain is found to differ from the prepended operator of the second AND/OR chain, then the method proceeds to 84 where the decomposition engine emits instruction code directing the computer to evaluate one or more if-then-else functions on the first and second AND/OR chains.

At 86 the decomposition engine emits instruction code directing the computer to expand the one or more if-then-else functions in terms of additional AND/OR chains. At 88 each of the additional AND/OR chains are evaluated. In some examples, each of the additional AND/OR chains may be evaluated in essentially the same way as the original AND/OR chains (e.g., as illustrated at 78, *ff*. of method 56B).

Figure 8:
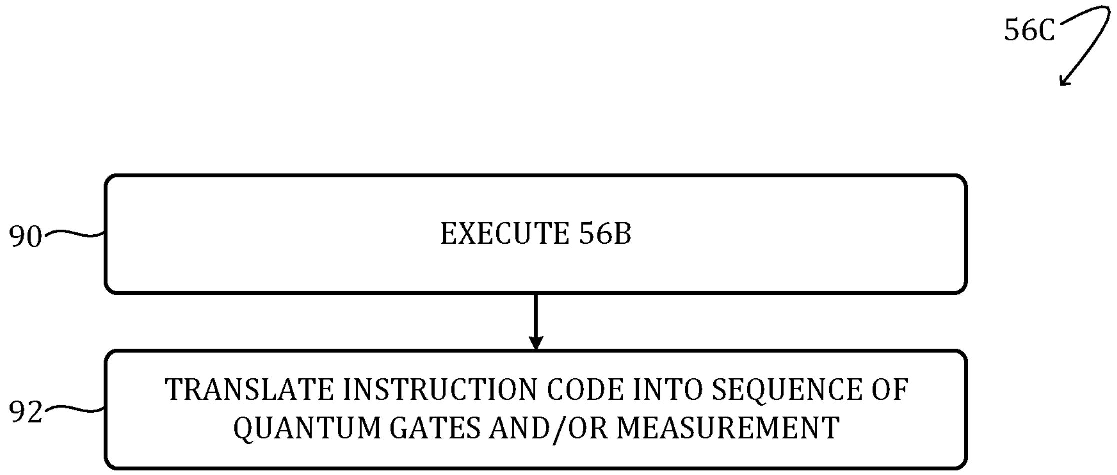
FIG. 8 shows aspects of another example method for emitting instruction code that directs a quantum computer to cooperatively evaluate first and second comparisons in the method of FIG. 4.

FIG. 8 shows aspects of another example method 56C for emitting instruction code that directs a quantum computer to cooperatively evaluate the first and second comparisons in method 50. In some examples, the illustrated blocks in FIG. 8 may correspond to blocks of instruction code emitted by the decomposition engine of the developer computer enacting method 50. Further, as noted in the context of FIG. 5, the emitted instruction code may comprise a sequence of quantum-logic gates drawn from {H, S, CNOT, T}, some or all of a graph, etc.

At 90 of method 56C, method 56B is enacted, thereby generating instruction code to direct a computer to cooperatively evaluate the first and second comparisons in method 50. As noted hereinabove, the instruction code generated includes a sequence of Boolean AND, XOR, and NOT gates. At 92 the instruction code generated at 90 is translated into executable code, which is executable on a quantum computer. Here, the executable code may comprise a sequence of quantum gates—e.g., reversible quantum gates combined, in some examples, with measurement. In particular, measurement-based uncomputation may be used to save on non-Clifford gates and/or magic states in a fault-tolerant setting. Doing so allows computation of an AND of two inputs with 4 T-gates (instead of 7), and the uncomputation step costs no non-Clifford resources. At the CNOT stage, it is then possible to use (x AND y). The AND is then uncomputed again using a Hadamard followed by a conditional CZ-correction.

Figure 9:
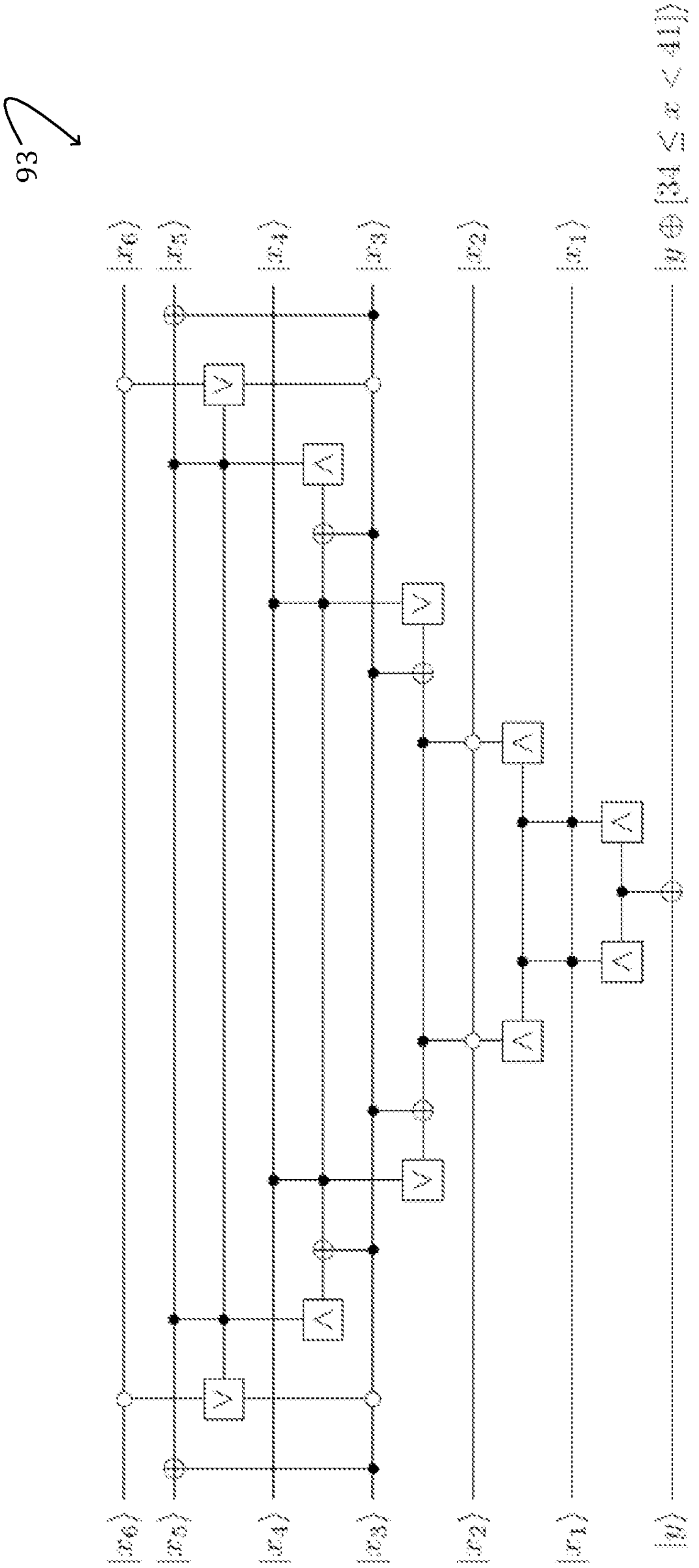
FIG. 9 shows aspects of an example quantum circuit obtained via the method of FIG. 8.

FIG. 9 shows aspects of an example quantum circuit 93 obtained by translation of Boolean logic gates, according to the method of FIG. 8. Specifically, quantum circuit 93 embodies an example construction for checking $[34 \le x < 41]$ for a 6-bit integer $x=(x_1, \ldots, x_6)_2$. The expression from the construction is $$(x_1 \wedge (\bar{x}_2 \wedge (x_3 \oplus (x_4 \vee (x_3 \oplus ((x_3 \oplus x_5) \wedge (\bar{x}_3 \vee \bar{x}_6))))))). \quad (30)$$

When translating this expression into a reversible circuit using reversible AND, OR, and XOR/NOT gates on extra helper qubits, one obtains quantum circuit 93. Note that quantum circuit 93 computes the expression in reverse order to uncompute the helper qubits after the result has been XORed with the target qubit $|y\rangle$,, using a CNOT gate.

In the context of optimizing for quantum-gate usage, it will be noted that the methods herein are AND-gate optimal for classical logic networks. It remains to be determined whether application of method 56C yields a T-gate optimal quantum circuit in the general case. Indeed, that question remains open even for a single AND-gate. However, it is known that between two and four T-gates are needed for every AND-gate. Moreover, an AND-gate in the quantum setting is a Toffoli gate where the output is a clean qubit in state $|0\rangle$. This can be implemented using four T-gates and measurement-based uncomputation, using no non-Clifford resources.

6. Interval-Test Analysis

Determined in this section is the multiplicative complexity for the interval test $[a \le x < b]$ based on the construction in the previous section. Determined first is an upper bound on the multiplicative complexity, simply by counting the number of AND and OR gates that appear when evaluating the formula based on the construction. Determined next is a lower bound by computing the degree of the construction. Thus the lower bound matches the upper bound, so the multiplicative complexity follows directly.

6.1. Upper Bound

In the following, let $u(f)$ be the number of AND/OR gates that are applied when evaluating $f$ according to the construction discussed in the previous section.

Lemma 4.

Let $f_1$ and $f_2$ be two AND/OR chains that do not contain x. Then $$u(ite(x, \bar{f}_2, f_1)) = \begin{cases} \ell(f_1) & \text{if } \ell(f_1) = \ell(f_2), \\ \max\{\ell(f_1), \ell(f_2)\} + 1 & \text{otherwise.} \end{cases} \quad (31)$$

Proof.

W.l.o.g. one may assume that $l(f_2) \ge l(f_1)$ and prove the statement with induction on $l(f_1)$. In the base case, $l(f_1)=0$, the statement follows from Eq 27a when $l(f_2)=0$. Otherwise, either Eq 27d or Eq 27e applies, which requires $2+l(f)=2+l(f_2)-1=l(f_2)+1$ AND or OR gates. For the induction step, assume that the statement holds for $l(f_1)=l$ and let $f'_1$ be an AND/OR chain with $l(f'_1)=l+1$. Then one of the cases in Eq 28a-Eq 28d must apply, which adds one AND or OR gate in each case and reduces the length of the formulas passed to 'ite' by one.

Lemma 5.

Let $f_1$ and $f_2$ be two distinct AND/OR chains. Then, $$u(f_1 \oplus f_2) = \begin{cases} \ell(f_1) - 1 & \text{if } \ell(f_1) = \ell(f_2), \\ \max\{\ell(f_1), \ell(f_2)\} & \text{otherwise.} \end{cases} \quad (32)$$

Proof.

One may assume w.l.o.g. that $l(f_2) \ge l(f_1)$. If the first k operators (indexed from 1 to k in Eq 11) in the AND/OR chains of $f_2$ and $f_1$ are the same, one can apply equations Eq 14a and Eq 14b k times, yielding $u(f_1 \oplus f_2)=k+u(f'_1 \oplus f'_2)$, where $f'_1$ and $f'_2$ are the remaining chains after splitting off the top most operators, with $l(f'_1)=l(f_1)-k$, and $l(f'_2)=l(f_2)-k$. Note that $f'_1 \ne f'_2$, since $f_1 \ne f_2$. Therefore, it is sufficient to consider the case in which the top most operators of $f'_1$ and $f'_2$ differ or the case in which $l(f'_1)=0$. In the first case, the statement follows from applying Lemma 4. In the second case, the statement follows from Eq 13.

6.2. Lower Bound

A lower bound on the multiplicative complexity is now proved by computing the algebraic degree of $f_1 \oplus f_2$, where $f_1$ and $f_2$ are AND/OR chains. To this end, the following fact is first proved for the case where $l(f_1)=l(f_2)$.

Lemma 6.

Let $f_1$ and $f_2$ be two distinct AND/OR chains of identical length n−1. Then, the largest monomial of $f_1$ is of length n and equal to that of $f_2$, and there exists a monomial of length n−1 that exists in only one of the two chains. Proof. Let $f$ denote an AND/OR chain with inputs $x_2, \ldots, x_n$. From $x_1 \vee f = x_1 \oplus f \oplus (x_1 \wedge f)$, it follows that the largest monomial of $f_1$ and $f_2$ is $(x_1 \wedge x_2 \wedge \ldots \wedge x_n)$. Since $f_1 \ne f_2$, there exists a largest position $k \le n-1$ at which the operators in $f_1$ and $f_2$ differ. W.l.o.g., $f_1$ has an $\vee$-operator and $f_2$ has an $\wedge$-operator in the k-th position. Thus $f_1 = f'_1 \circ (x_k \vee g(x_{k+1}, \ldots, x_n))$ and $f_2 = f'_2 \bullet (x_k \wedge g(x_{k+1}, \ldots, x_n))$, where $f'_1$ and $f'_2$ are prefixes involving variables $x_1, \ldots, x_{k-1}$ and g is an AND/OR chain with the largest monomial $(x_{k+1} \wedge \ldots \wedge x_n)$. In turn, this is one of the second largest monomials in the ANF of $x_k \vee g = x_k \oplus g \oplus x_k \wedge g$, but not in the ANF of $x_k \wedge g$, where all monomials feature the variable $x_k$. Consequently, note that $f_1$ features the monomial $x_1 \wedge \ldots \wedge x_{k-1} \wedge x_{k+1} \wedge \ldots \wedge x_n$, which is not present in the ANF of $f_2$.

With the help of Lemma 6, one may now compute the algebraic degree of $f_1 \oplus f_2$.

Lemma 7.

Let $f_1$ and $f_2$ be two distinct AND/OR chains. Then, $$deg(f_1 \oplus f_2) = \begin{cases} \ell(f_1) & \text{if } \ell(f_1) = \ell(f_2), \\ \max\{\ell(f_1), \ell(f_2)\} + 1 & \text{otherwise.} \end{cases} \quad (33)$$

Proof.

In the case $l(f_1) \neq l(f_2)$, assume w.l.o.g. that $l(f_1) > l(f_2)$. The degree of $f_1$ is $l(f_1)+1$ (see Lemma 2) since its single largest monomial contains all variables in the support of $f_1$. All monomials of $f_2$ are smaller, and therefore $deg(f_1 \oplus f_2) = deg(f_1) = l(f_1)+1$.

If $l(f_1) = l(f_2)$, then Lemma 6 implies that the largest monomials of $f_1$ and $f_2$ are identical and thus no longer present in the ANF of $f_1 f_2$, and that there exists a monomial of length $l(f_1)$ that is present in only one of the two ANFs and thus also in the ANF of $f_1 \oplus f_2$. Therefore, $deg(f_1 \oplus f_2) = deg(f_1) - 1 = l(f_1)$.

6.3. Proof of Theorem 1

In view of the analysis above, the main theorem may now be proved.

Proof.

$$f = [a \leq x < b] = [a \leq x] \oplus [b \leq x] \quad (34)$$

$$= \underbrace{\left[\left(a/2^{j_a}\right) \leq (x_1 \ \ldots \ x_{n-j_a})_2\right]}_{f_a} \oplus \underbrace{\left[\left(b/2^{j_b}\right) \leq \left(x_1 \ \ldots \ x_{n-j_b}\right)_2\right]}_{f_b} \quad (35)$$

$$= f_a \oplus f_b \quad (36)$$

From Corollary 1, $l(f_a) = n - j_a - 1$ and $l(f_b) = n - j_b - 1$, and therefore $\max\{l(f_a), l(f_b)\} = n - \min\{j_a, j_b\} - 1$. From Lemma 5, it follows that $c_\wedge(f) \leq n - \min\{j_a, j_b\} - 1 - \delta_{j_a j_b}$, and from Lemma 7 together with Lemma 1, it follows that $c_\wedge(f) \geq n - \min\{j_a, j_b\} - 1 - \delta_{j_a j_b}$. Therefore, $$c_\wedge(f) = n - \min\{j_a, j_b\} - 1 - \delta_{j_a j_b}, \quad (37)$$

where $\delta_{ij}$ denotes the Kronecker delta.

7. Interval-Test Conclusions

Derived herein is the multiplicative complexity for interval testing of an n-bit non-negative number given two constant bounds. The construction is of practical interest as it reduces the cost compared to a construction composed of two comparators up to a factor of 2. This motivates a study of the multiplicative complexity of similar composite operations, e.g., $[x=y \pm a]$ or $[a \leq x+y]$, where a is a constant. The work may provide some insight into determining the multiplicative complexity of more difficult operations such as multiplication, which can be considered as a composition of simpler arithmetic operations.

Of further interest is the multiplicative complexity of formulas $f = \text{ite}(x, f_1, f_2)$. In general $c_\wedge(f) \leq 1 + c_\wedge(f_1) + c_\wedge(f_2)$, but found herein are examples in which the complexity did not exceed the cost of the more expensive subformula—in some cases $f$ was even less expensive than either $f_1$ or $f_2$. Ideally, it would be desirable to find characteristic properties for $f_1$ and $f_2$ that hold, if and only if $c_\wedge(f) \leq \max\{c_\wedge(f_1), c_\wedge(f_2)\}$.

For additional context, the interested reader is referred to the following references, which are hereby incorporated by reference herein, for all purposes.

[Ref. 1] M. R. Albrecht, C. Rechberger, T. Schneider, T. Tiessen, and M. Zohner. Ciphers for MPC and FHE. In *Int'l Conf. on the Theory and Applications of Cryptographic Techniques,* 430-454, 2015.

[Ref. 2] M. Chase, D. Derler, S. Goldfeder, C. Orlandi, S. Ramacher, C. Rechberger, D. Slamanig, and G. Zaverucha. Post-quantum zero-knowledge and signatures from symmetric-key primitives. In *ACM SIGSAC Conf. on Computer and Communications Security,* 1825-1842, 2017.

[Ref. 3] I. Giacomelli, J. Madsen, and C. Orlandi. ZKBoo: Faster zero-knowledge for Boolean circuits. In *USENIX Security Symposium,* 1069-1083, 2016.

[Ref. 4] G. Meuli, M. Soeken, E. Campbell, M. Roetteler, and G. De Micheli. The role of multiplicative complexity in compiling low T-count oracle circuits. In *Int'l Conf. on Computer-Aided Design,* 1-8, 2019.

[Ref. 5] M. G. Find. On the complexity of computing two nonlinearity measures. In *Int'l Computer Science Symposium in Russia,* 167-175, 2014.

[Ref. 6] J. Boyar, R. Peralta, and D. Pochuev. On the multiplicative complexity of Boolean functions over the basis (∧, ⊕, 1). *Theoretical Computer Science,* 235(1): 43-57, 2000.

[Ref. 7] R. Mirwald and C. Schnorr. The multiplicative complexity of quadratic Boolean forms. In *Foundations of Computer Science, IEEE Computer Society,* 141-150, 1987.

[Ref. 8] Ç. Çalik, M. S. Turan, and R. Peralta. The multiplicative complexity of 6-variable Boolean functions. *Cryptography and Communications,* 11(1):93-107, 2019.

[Ref. 9] Ç. Çalik, M. S. Turan, and R. Peralta. Boolean functions with multiplicative complexity 3 and 4. *Cryptography and Communications,* 12(5):935-946, 2020.

[Ref. 10] L. T. A. N. Brandão, Ç. Çalik, M. S. Turan, and R. Peralta. Upper bounds on the multiplicative complexity of symmetric Boolean functions. *Cryptography and Communications,* 11(6):1339-1362, 2019.

[Ref. 11] J. Boyar and R. Peralta. The exact multiplicative complexity of the Hamming weight function. *Electronic Colloquium on Computational Complexity*, (049), 2005.

[Ref. 12] C.-P. Schnorr. The multiplicative complexity of Boolean functions. In *Int'l Conf. on Applied Algebra, Algebraic Algorithms and Error-Correcting Codes,* 45-58, 1988

8. Classical Computer System and Additional Description

The methods herein may be tied to a computer system of one or more computing devices. Such methods and processes may be implemented as an application program or service, an application programming interface (API), a library, and/or other computer-program product.

FIG. 10 provides a schematic representation of a classical computer 42 configured to provide some or all of the classical computer system functionality disclosed herein. Classical computer 42 may take the form of a personal computer, application-server computer, or any other computing device.

Classical computer 42 includes a logic system 96 and a computer-memory system 98. Classical computer 42 may optionally include a display system 100, an input system 102, a network system 104, and/or other systems not shown in the drawings.

Logic system 96 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 98 includes at least one physical device configured to temporarily and/or permanently hold computer system information, such as data and instructions executable by logic system 96. When the computer-memory system includes two or more devices, the devices may be collocated or remotely located. Computer-memory system 98 may include at least one volatile, nonvolatile, dynamic, static, read/write, read-only, random-access, sequential-access, location-addressable, file-addressable, and/or content-addressable computer-memory device. Computer-memory system 98 may include at least one removable and/or built-in computer-memory device. When the logic system executes instructions, the state of computer-memory system 98 may be transformed—e.g., to hold different data.

Aspects of logic system 96 and computer-memory system 98 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 96 and computer-memory system 98 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 100 may be used to present a visual representation of data held by computer-memory system 98. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 102 may comprise or interface with one or more input devices. An input device may include a sensor device or a user input device. Examples of user input devices include a keyboard, mouse, or touch screen.

When included, network system 104 may be configured to communicatively couple classical computer 42 with one or more other computer systems. The network system may include wired and/or wireless communication devices compatible with one or more different communication protocols. The network system may be configured for communication via personal-, local- and/or wide-area networks.

In conclusion, one aspect of this disclosure is directed to a quantum computer comprising a qubit register and an interface. The qubit register includes a plurality of qubits. The interface is configured to physically manipulate the qubits of the qubit register according to a sequence of quantum-logic gates parsed from executable code. The executable code directs the quantum computer to execute an interval test to determine whether an interval defined by integers a and b encloses an integer x, the interval test including a first comparison between the integer a and the integer x and a second comparison between the integer b and the integer x. The interval test comprises evaluating the first and second comparisons cooperatively, at lower complexity than the complexity of the first comparison enacted separately combined with the complexity of the second comparison enacted separately.

In some implementations, the executable code directs the computer to execute a Deutsch algorithm. In some implementations, the executable code comprises a sequence of reversible quantum-logic gates translated from a sequence of Boolean logic gates.

Another aspect of this disclosure is directed to a method for compiling executable code for execution on a computer. The method comprises: (a) receiving source code instructing the computer to execute an interval test to determine whether an interval defined by integers a and b encloses an integer x; (b) decomposing the interval test into a first comparison between the integer a and the integer x and a second comparison between the integer b and the integer x; and (c) returning instruction code directing the computer to evaluate the first and second comparisons cooperatively, at lower complexity than the complexity of the first comparison enacted separately combined with the complexity of the second comparison enacted separately.

In some implementations, the instruction code comprises a straight-line sequence of Boolean AND, XOR and NOT gates. In some implementations, the complexity is proportional to the number of AND gates in the sequence. In some implementations, the computer is a quantum computer. In some implementations, the instruction code comprises a sequence of quantum-logic gates, and the complexity is proportional to the number of Toffoli gates in the sequence. In some implementations, the instruction code directs the computer to implement the interval test via a Deutsch algorithm. In some implementations, the instruction code directs the computer to implement the interval test via a single comparator gate. In some implementations, the instruction code directs the computer to initialize an ancilla register to either $|a\rangle$ or $|b\rangle$ conditional on an input $|y\rangle$,, where $|y\rangle$ is a single-qubit basis state. In some implementations, the instruction code directs the computer to compare the ancilla register to $|x\rangle$ prior to uncomputing the ancilla register. In some implementations, the method further comprises translating the instruction code into the executable code, and the executable code includes a sequence of reversible quantum gates. In some implementations, the instruction code directs the computer to evaluate each of the first and second comparisons as respective first and second AND/OR chains $x_1 \circ f(x_1, \ldots, x_n)$, where $f$ is a Boolean function of bit values $x_i$ of the integer x, and where $\circ$ is an AND operator or an OR operator. In some implementations, $f = x_1 c_1(x_2 c_2(\ldots(x_{n-1} c_{n-1} x_n \ldots))$, where, for any odd value $(a_1 \ldots a_{n1})$ of the integer a, $c_i$=OR if $a_i$=0 and $c_i$=AND if $a_i$=1. In some implementations, the instruction code directs the computer to evaluate the first and second AND/OR chains recursively, thereby shortening each of the AND/OR chains until a prepended operator of the first AND/OR chain differs from the prepended operator of the second AND/OR chain. In some implementations, the instruction code directs the computer to evaluate one or more if-then-else functions on the first and second AND/OR chains when the prepended operator of the first AND/OR chain differs from the prepended operator of the second AND/OR chain. In some implementations, the instruction code directs the computer to expand the one or more if-then-else functions in terms of additional AND/OR chains. In some implementations, the method further comprises incorporating the instruction code into a cryptographic program.

Another aspect of this disclosure is directed to a server computer system coupled operatively to a quantum computer, the server computer system comprises a network interface and a compiler. The network interface is configured to receive source code instructing the quantum computer to execute an interval test to determine whether an interval defined by integers a and b encloses an integer x. The compiler is configured to: (a) decompose the interval test into a first comparison between the integer a and the integer x and a second comparison between the integer b and the integer x; and (b) return instruction code directing the computer to evaluate the first and second comparisons cooperatively, at lower complexity than the complexity of the first comparison enacted separately combined with the complexity of the second comparison enacted separately.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A quantum computer comprising:

a qubit register including a plurality of qubits; and an interface configured to physically manipulate the qubits of the qubit register according to a sequence of quantum-logic gates parsed from executable code, wherein the executable code directs the quantum computer to execute an interval test to determine whether an interval defined by integers a and b encloses an integer x, the interval test including a first comparison between the integer a and the integer x and a second comparison between the integer b and the integer x, and wherein the interval test comprises evaluating the first and second comparisons cooperatively, at a lower complexity than the complexity of the first comparison enacted separately combined with the complexity of the second comparison enacted separately.

2. The quantum computer of claim 1 wherein the executable code directs the computer to execute a Deutsch algorithm.

3. The quantum computer of claim 1 wherein the executable code comprises a sequence of reversible quantum-logic gates translated from a sequence of Boolean logic gates.

4. A method for compiling executable code for execution on a quantum computer, the method comprising:

receiving source code instructing the quantum computer to execute an interval test to determine whether an interval defined by integers a and b encloses an integer x;

decomposing the interval test into a first comparison between the integer a and the integer x and a second comparison between the integer b and the integer x; and returning instruction code directing the quantum computer to evaluate the first and second comparisons cooperatively, at a lower complexity than the complexity of the first comparison enacted separately combined with the complexity of the second comparison enacted separately, wherein the instruction code comprises a sequence of quantum-logic gates which operate on a register of physical of qubits of the quantum computer, via a hardware interface.

5. The method of claim 4 wherein the instruction code comprises a straight-line sequence of Boolean AND, XOR, and NOT gates.

6. The method of claim 5 wherein the complexity is proportional to a number of AND gates in the sequence.

7. The method of claim 4 wherein the complexity is proportional to a number of Toffoli gates in the sequence.

8. The method of claim 4 wherein the instruction code directs the quantum computer to implement the interval test via a Deutsch algorithm.

9. The method of claim 8 wherein the instruction code directs the quantum computer to implement the interval test via a single comparator gate.

10. The method of claim 8 wherein the instruction code directs the quantum computer to initialize an ancilla register to either $|a\rangle$ or $|b\rangle$ conditional on an input $|y\rangle$, where $|y\rangle$ is a single-qubit basis state.

11. The method of claim 10 wherein the instruction code directs the quantum computer to compare the ancilla register to $|x\rangle$ prior to uncomputing the ancilla register.

12. The method of claim 4 further comprising translating the instruction code into the executable code, and wherein the executable code includes a sequence of reversible quantum gates.

13. The method of claim 4 wherein the instruction code directs the quantum computer to evaluate each of the first and second comparisons as respective first and second AND/OR chains $x_1 \circ f(x_1, \ldots, x_n)$, where $f$ is a Boolean function of bit values $x_i$ of the integer x, and where $\circ$ is an AND operator or an OR operator.

14. The method of claim 13 wherein $f = x_1 c_1 (x_2 c_2 ( \ldots (x_{n-1} c_{n-1} x_n) \ldots ))$, where, for any odd value $(a_1 \ldots a_{n1})$ of the integer a, $c_i$=OR if $a_i$=0 and $c_i$=AND if $a_i$=1.

15. The method of claim 14 wherein the instruction code directs the quantum computer to evaluate the first and second AND/OR chains recursively, thereby shortening each of the AND/OR chains until a prepended operator of the first AND/OR chain differs from the prepended operator of the second AND/OR chain.

16. The method of claim 15 wherein the instruction code directs the quantum computer to evaluate one or more if-then-else functions on the first and second AND/OR chains when the prepended operator of the first AND/OR chain differs from the prepended operator of the second AND/OR chain.

17. The method of claim 16 wherein the instruction code directs the quantum computer to expand the one or more if-then-else functions in terms of additional AND/OR chains.

18. The method of claim 4 further comprising incorporating the instruction code into a cryptographic program.

19. A server computer system coupled operatively to a quantum computer, the server computer system comprising:

a network interface configured to receive source code instructing the quantum computer to execute an interval test to determine whether an interval defined by integers a and b encloses an integer x; and a compiler configured to:

decompose the interval test into a first comparison between the integer a and the integer x and a second comparison between the integer b and the integer x, and return instruction code directing the computer to evaluate the first and second comparisons cooperatively, at a lower complexity than the complexity of the first comparison enacted separately combined with the complexity of the second comparison enacted separately, wherein the instruction code comprises a sequence of quantum-logic gates which operate on a register of physical of qubits of the quantum computer, via a hardware interface.

* * * * *